United States Patent [19]

Graves

[11] Patent Number: 5,219,457

[45] Date of Patent: Jun. 15, 1993

[54] COUNTERTOP SINK ILLUSTRATOR AND METHOD

[76] Inventor: Linda K. Graves, 8582 Palm Ave., Orange, Calif. 92665

[21] Appl. No.: 949,408

[22] Filed: Sep. 22, 1992

[51] Int. Cl.⁵ ............................................. G09B 25/00
[52] U.S. Cl. ...................... 434/80; 434/382; 434/430
[58] Field of Search .................. 434/80, 98, 382, 428, 434/430

[56] References Cited

U.S. PATENT DOCUMENTS

| | | | |
|---|---|---|---|
| 2,405,808 | 8/1946 | Ambright | 434/80 |
| 2,528,211 | 10/1950 | Civkin et al. | 434/80 |
| 4,830,619 | 5/1989 | Marion | 434/80 X |
| 4,902,229 | 2/1990 | Penderson et al. | 434/80 |
| 5,152,689 | 10/1992 | Kurzman | 454/80 X |

Primary Examiner—John J. Wilson
Assistant Examiner—L. Thomas
Attorney, Agent, or Firm—Roy A. Ekstrand

[57] ABSTRACT

A countertop sink illustrator and method utilize a photographic process to image a selected sink and countertop to produce an image corresponding to the image area surrounding and including the sink as well as the sink opening portion of a countertop. An illustrator includes a substrate having a front surface upon which a full-size color reproduction image of the imaged area including the sink, sink opening, and surrounding countertop portion is supported upon one surface thereof. The reverse surface of the substrate supports a dimensional drawing having appropriate dimensional information relating to the sink opening an sink structure for use by the consumer in determining the size requirements of the particular sink. A clear laminate formed of a pair of clear plastic laminations is secured to the substrate surfaces to provide a protective supporting enclosure.

7 Claims, 1 Drawing Sheet

COUNTERTOP SINK ILLUSTRATOR AND METHOD

FIELD OF THE INVENTION

This invention relates generally to kitchen facilities and particularly to the countertop and sink installations situated therein.

BACKGROUND OF THE INVENTION

In virtually every kitchen and similar facility in which a recessed sink or other similar facility is situated, the facility includes a countertop of some sort providing a flat working surface usually encircling and extending in either or both directions from the recessed sink. While the fabrication of countertop and sink combinations has varied substantially through the years, in general all provide a flat planar surface having a sink opening defined therein. A recessed sink often having a plurality of individual bowl portions or the like is secured to the countertop and extends beneath the sink opening. Various types of mechanical attachment mechanisms are used to secure the sink and countertop in a tight liquid seal attachment intended to simultaneously provide an attractive outer appearance.

Because of the wide differences in customer needs and customer preferences, practitioners in the art have provided many types and colors of sink and countertop materials and styles as preferences and styles have changed. Colors alone have provided a substantial variation and numbers of combinations as countertops and sinks have transitioned from the common white or off-white utilitarian items to items having colors which provide fashion accents and eye appeal within the kitchen. The style of such facilities has also changed considerably through the years as designers attempt to brighten and lighten kitchens to provide an enjoyable work environment for the user. A number of advanced materials have also been provided which has further increased the available options to the consumers. For example, countertops are now available having been formed of high strength marbleized or epoxy type materials as well as ceramic materials or the like leading to one piece molded style countertops having a minimum of visible seams or other discontinuities.

This substantial variety of sinks and countertops available to the consumers leads to a great number of combinations available and while providing flexibility and excitement to the user greatly complicates the selection process. Dealers in such products in attempting to service consumers often select several combinations and provide kitchen mock-ups or showrooms which permit the consumer to directly view a full size example of the selected combinations. The problem, however, is that as a practical matter, the dealer cannot afford to install examples of the many combinations of product and color and style from which the consumer may select. Faced with the need to interest and please consumers together with the limitations of space for providing full size displays of such products, dealers have resorted to various sales brochures and photograph collections to be used in combination with selected full size showroom combinations.

While such photo combinations and brochures assist the consumer, the fact remains that a great number of consumers are not comfortable selecting a large size important item such as a counter and sink combination using a picture or brochure. This simple fact is the consumer has a need or at least desire in most instances to view a full size article prior to making the product choice. Thus, a dilemma arises in that purchasers find themselves traveling from store to store hoping to view the combination or combinations in which they are interested while retailers having limited showroom space are forced to watch potential customers leave their facility and travel to a competitor's facility to view the final product.

There remains, therefore, a need in the art for a simple, effective and economically practical system for permitting the dealer of countertop and sink products to permit potential customers to view a realistic example of the combination which interests them without the need of impractical expensive showroom facilities.

SUMMARY OF THE INVENTION

Accordingly, it is a general object of the present invention to provide an improved countertop sink illustrator and method therefor. It is a more particular object of the present invention to provide an improved countertop sink illustrator and method therefor which avoids the need of maintaining extensive showroom facilities to satisfy customer needs.

In accordance with the present invention, there is provided for use in providing a consumer display and informational package of a countertop and sink combination, the method comprises the steps of: arranging a selected countertop defining a sink opening therein and a selected sink such that the sink is observable through the sink opening; photographing an image area of the countertop including the sink, the sink opening, and a portion of the countertop surrounding the sink opening to produce a full-size color image of the image area on one side of a two-sided planar substrate; applying a dimensional drawing of the selected sink together with additional related information to the remaining side of the planar substrate; and laminating the planar substrate with a clear plastic laminate on each of the sides thereof to cover the two sides and form a sealed border enclosing the planar substrate.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
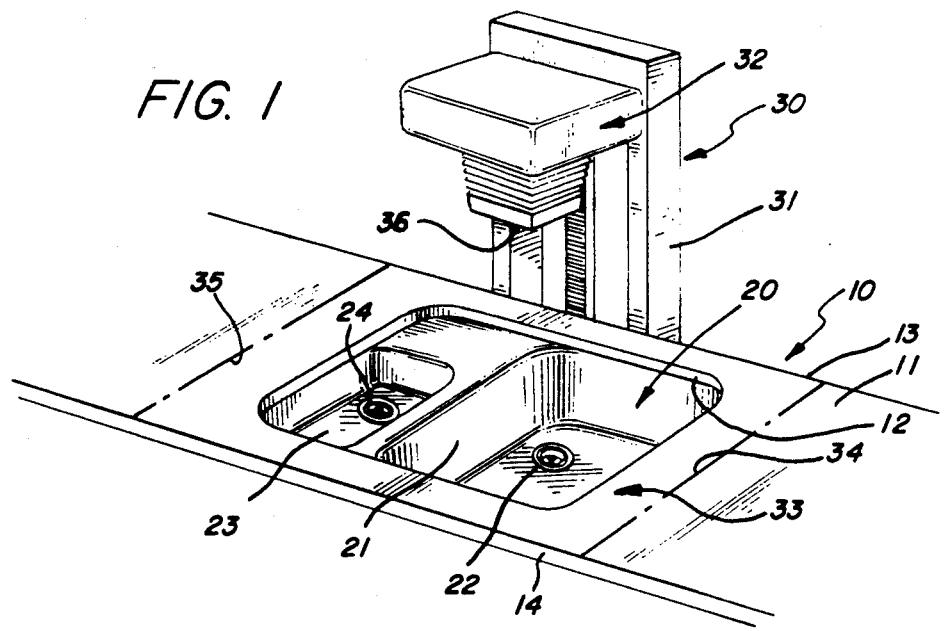
FIG. 1 sets forth a perspective view of a photographic apparatus utilized in accordance with the present invention.

FIG. 1 sets forth a perspective view of a typical countertop and sink combination during the photographic or imaging portion of the present invention method which produces the present invention countertop sink illustrator. A countertop 10 constructed in accordance with conventional fabrication techniques defines a front edge 13 and rear edge 14 as well as a sink opening 12. A conventional sink 20 defines a main basin 21 having a drain 22 therein together with a secondary basin 23 having a drain 24 supported therein. Sink 20 is positioned in alignment with sink opening 12 and secured or supported in proximity to countertop 10 in accordance with the anticipated fabrication typical of countertop and sink installations.

A camera system 30 includes a camera support 31 and a camera 32 fabricated in accordance with conventional fabrication techniques. Camera 32 includes a downwardly facing lens 33 directed toward countertop 10 and sink 20.

In accordance with the present invention, camera 32 is positioned with respect to countertop 10 and sink 20 to provide an imaging area generally referenced by numeral 33 extending between a pair of dashed lines 34 and 35 as well as countertop edges 13 and 14. Thus, imaging area 33 includes sink opening 12, sink 20 as well as a substantial surrounding portion of countertop 10. In the preferred practice of the present invention method and to produce the present invention countertop sink illustrator, camera 32 and camera support 31 are configured so as to position lens 36 above countertop 10 to provide a photographic axis or direction which is generally perpendicular to upper surface 11 of countertop 10. Thus, the image elements within imaging area 33 will be undistorted and properly proportioned to provide a full-size accurate depiction thereof. In accordance with the preferred embodiment of the present invention, camera system 30 color photographs or images imaging area 33 for use in preparing the illustrator set forth below in greater detail.

Figure 2:
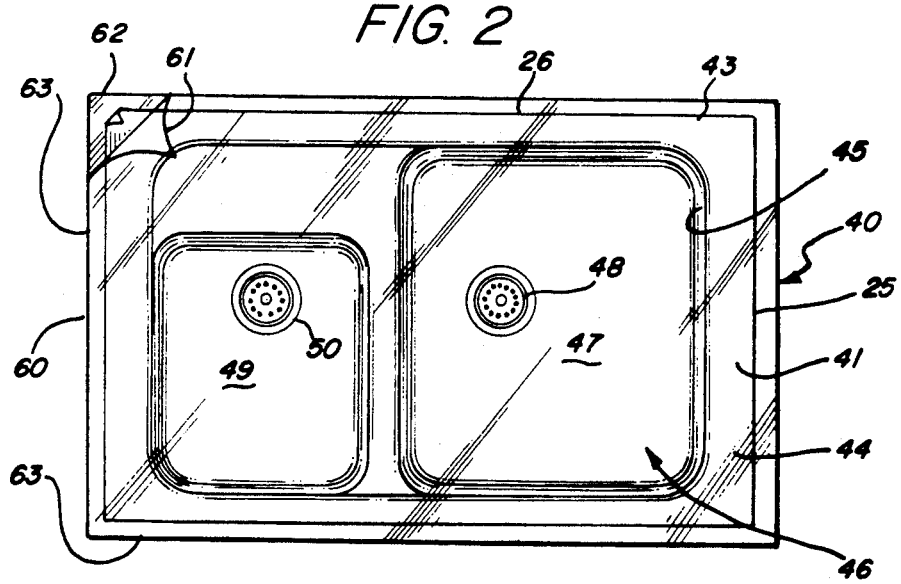
FIG. 2 sets forth the front surface of the present invention countertop sink illustrator.

FIG. 2 sets forth a front view of a countertop sink illustrator constructed in accordance with the present invention and generally referenced by numeral 40. Illustrator 40 includes a substrate 25 preferably formed of a heavy paper or similar cellular material having a full size color image 43 corresponding to image area 33 (seen in FIG. 1) on the front surface 41. Image 33 accurately depicts the elements imaged within imaging area 33 and thus a sink opening image 45 as well as a full size image of sink 20 defining a sink image 46 are shown in image 43. Sink image 46 defines an accurate depiction in both color and size of sink 20 and thus, for example, defines a basin image 47, a drain image 48, a secondary basin image 49 and a drain image 50. Because image 43 is an accurately colored image, the color relationships of countertop image 44 and sink image 46 are also preserved to facilitate the consumer's evaluation of the color combination as well as the physical relationships presented by countertop 10 and sink 20 (seen in FIG. 1). Illustrator 40 further includes a clear laminate 60 preferably formed of a pair of clear plastic laminations 61 and 62 secured on opposed sides of substrate 25. Substrate 25 defines an outer edge 26 and clear laminations 61 and 62 are sized to extend beyond edge 26 and are heat sealed together while pressing the air from said sides while pressing the air from said sides to form a sealed border 63 encircling substrate 25.

Figure 3:
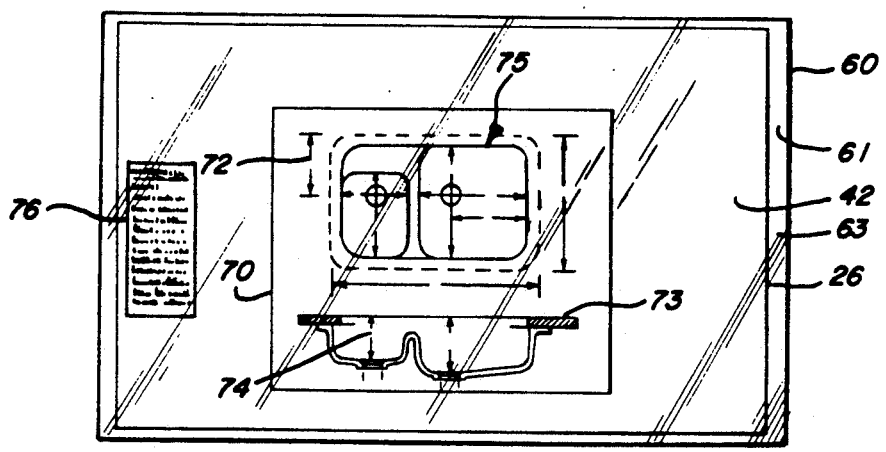
FIG. 3 sets forth the reverse side of the present invention countertop sink illustrator.

FIG. 3 sets forth a rear view of illustrator 40. As described above, illustrator 40 includes a planar substrate 25 having an outer edge 26 and a rear surface 42. In accordance with an important aspect of the present invention, rear surface 42 includes a dimensional drawing set generally referenced by numeral 70. Drawing set 70 provides a section view 73 and top plan view 75 corresponding to sink 20 and countertop 10. In further accordance with the present invention, top plan view 75 and section view 73 each include a plurality of dimensional notations or reference characters 72 and 74 respectively. In its preferred form, dimensional drawing 70 further includes additional tabular information set forth in a table 76. It should be noted that dimensional drawing 70 as well as table 76 provide information directly related to the selected one of a plurality of sinks utilized as sink 20 as well as the selected one of a plurality of countertops used as countertop 10 during the imaging process set forth in FIG. 1 and comprising the resulting countertop image and sink image set forth in FIG. 2. Thus, in accordance with an important aspect of the present invention, illustrator 40 provides a convenient accurate full-size depiction of the imaging area together with the corresponding relevant dimensional and additional information related thereto in a convenient, easy to use and easy to store illustrator. The use of plastic lamination or the like to provide protective coverings for the front and rear surfaces of substrate 25 provide additional support and substance for illustrator 40 while protecting the images supported thereon. In the preferred embodiment, the table 76 provides additional related information including a table having families of size dimensions cross-referenced to the reference characters 72 and 74.

What has been shown is a convenient and extremely practical alternative to the present devices utilized by practitioners for demonstrating various color and style combinations in counter top and sink apparatus. The use of full-size color imaging of the sink and surrounding portion of the countertop enable the consumer to readily visualize and evaluate the combination in a manner vastly superior to the brochures and photographic sets provided to consumers under conventional practices presently in use. The inclusion of relevant dimensional data and other information on the reverse side of the illustrator assures proper coordination of dimensional information and avoids the likelihood of confusion as the consumer is considering such matters as the ability to fit a particular sink within their own particular environment.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in providing a consumer display and informational package of a countertop and sink combination, the method comprising the steps of:

arranging a selected countertop defining a sink opening therein and a selected sink such that said sink is observable through said sink opening;

photographing an image area of said countertop including said sink, said sink opening, and a portion of said countertop surrounding said sink opening to produce a full-size color image of said image area on one side of a two-sided planar substrate;

applying a dimensional drawing of said selected sink together with additional related information to the remaining side of said planar substrate; and laminating said planar substrate with a clear plastic laminate on each of said sides thereof to cover said two sides and form a sealed border enclosing said planar substrate.

2. The method of claim 1 wherein said countertop defines a planar top surface and wherein said photographing step includes imaging along an axis perpendicular to said surface top.

3. The method of claim 2 wherein said laminating step includes heat sealing said laminate formed of a pair of plastic laminations on said two surfaces while pressing the air from said surfaces.

4. The method of claim 3 wherein said steps of arranging, photographing, applying and laminating are repeated for additional selected countertop and sink combinations.

5. For use in providing an accurate appearance replica and dimensional information relating to a selected countertop and sink combination, a countertop sink illustrator comprising:
   a substrate having two opposed sides;
   a full-size color image of an image area including a selected sink and a portion of a selected countertop defining a sink opening through which said sink is visibly supported on one of said two sides;
   a dimensional drawing of said selected sink together with additional related information supported upon the remaining one of said two surfaces; and
   a clear plastic laminate covering said color image and said dimensional drawing and related information, said laminate forming a scaled border around said substrate.

6. A countertop sink illustrator as set forth in claim 5 wherein said color image is a photograph.

7. A countertop sink illustrator as set forth in claim 6 wherein said dimensioned drawing includes a plurality of reference characters and wherein said additional related information includes a table having families of size dimensions cross-referenced to said plurality of reference characters.

* * * * *